United States Patent [19]
Miles et al.

[11] Patent Number: 5,957,469
[45] Date of Patent: *Sep. 28, 1999

[54] SPRING CHUCK

[75] Inventors: Kevin C. Miles; Benjamin A. Gaddis, both of Clemson, S.C.

[73] Assignee: Power Tool Holders, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,890

[22] Filed: Sep. 25, 1996

[51] Int. Cl.⁶ .................................................... B23B 31/12
[52] U.S. Cl. .............................. 279/62; 279/140; 279/902
[58] Field of Search ................................. 279/60–65, 140, 279/902; 408/240

[56] References Cited

U.S. PATENT DOCUMENTS

| | | |
|---|---|---|
| 573,189 | 12/1896 | Vogel . |
| 5,125,673 | 6/1992 | Huff et al. . |
| 5,172,923 | 12/1992 | Nakamura . |
| 5,234,223 | 8/1993 | Sakamaki . |
| 5,322,303 | 6/1994 | Nakamura . |
| 5,348,317 | 9/1994 | Steadings et al. . |
| 5,431,419 | 7/1995 | Mack . |
| 5,458,345 | 10/1995 | Amyot . |
| 5,499,829 | 3/1996 | Rohm . |
| 5,499,830 | 3/1996 | Schnizler . |
| 5,501,473 | 3/1996 | Barton et al. . |
| 5,615,899 | 4/1997 | Sakamaki . |
| 5,741,016 | 4/1998 | Barton et al. ............................. 279/62 |
| 5,816,582 | 10/1998 | Steadings et al. ........................ 279/62 |
| 5,816,583 | 10/1998 | Middleton ................................ 279/902 |

FOREIGN PATENT DOCUMENTS

| | | |
|---|---|---|
| 0618029A1 | 10/1994 | European Pat. Off. . |
| 0710518A2 | 4/1995 | European Pat. Off. . |
| 0710519A2 | 4/1995 | European Pat. Off. . |
| 0710520A2 | 4/1995 | European Pat. Off. . |
| 0677348A1 | 10/1995 | European Pat. Off. . |
| 2645056 | 10/1990 | France .................................. 279/902 |
| 4238503C1 | 11/1993 | Germany . |
| 19506708 | 3/1996 | Germany . |
| 29600727U1 | 4/1996 | Germany . |
| 4438991A1 | 5/1996 | Germany . |
| 4365504 | 12/1992 | Japan . |

*Primary Examiner*—Steven C. Bishop
*Attorney, Agent, or Firm*—Dority & Manning, P.A.

[57] ABSTRACT

Chuck for use with manual or powered driver having rotatable shaft, the chuck including a body member and jaws slidably positioned in angled passageways formed in the body. The chuck further includes a nut rotatably mounted relative to the body member and in engagement with threads on the jaws. A generally cylindrical sleeve member is disposed in driving engagement with the nut and overlying the nose section of the body so that when the sleeve member is rotated with respect to the body, the jaws will be moved thereby to grip the shaft of a tool. A spring member is biased to engage the sleeve member and is disposed selectively rotatably with respect to the nut. When the nut is tightened, the spring member becomes locked to the body member, which has an engagement portion that facilitates this locking relationship. When so locked, the nut is restrained from loosening during vibration of the chuck in use for its intended purpose.

25 Claims, 5 Drawing Sheets

SPRING CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction with respect to a constrained nut engaging the jaws, forces the jaws into gripping relationship with the cylindrical shank of a tool. Rotation in the opposite direction releases the gripping relationship. Such a chuck may be keyless if it is rotated by hand. One example of such a chuck is disclosed in U.S. Pat. No. 5,125,673 entitled "Non-Impact Keyless Chuck" commonly assigned to the present assignee, and whose entire disclosure is incorporated herein by this reference.

Despite the success of keyless chucks such as set forth in U.S. Pat. No. 5,125,673, varying configurations of keyless chucks are desirable for a variety of applications. Of course, it would also be desirable to have a keyless chuck that requires fewer components and/or lower manufacturing cost.

In a conventional chuck used to secure a drill engaged in hammer drilling for example, the vibration that results from use of the tool, can cause the jaws to loosen their grip around the shaft of the tool. This can have undesirable consequences, both for the work piece and for the operation of the tool.

OBJECTS AND SUMMARY OF THE INVENTION

The present invention recognizes and addresses the foregoing considerations, and others of prior art constructions and methods.

Accordingly, it is an object of the present invention to provide an improved chuck wherein vibration during use does not cause the jaws to loosen their grip around the shaft of the tool.

It is also an object of the present invention to provide an improved keyless chuck.

It is another object of the present invention to provide a keyless chuck that allows for efficient tightening of the nut on the jaws during operation.

It is another object of the present invention to provide a keyless chuck that has a minimum number of individual components that must be assembled.

It is a further object of the present invention to provide a keyless chuck that improves the mechanism for limiting axial travel of the nut beyond a predetermined location.

These and other objects are achieved by providing a chuck for use with a manual or power driver having a rotatable drive shaft, the chuck comprising a generally cylindrical body member having a nose section and a tail section. The tail section has an axial bore formed therein to mate with the drive shaft of the driver, and the nose section has an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck also includes a nut rotatably mounted with respect to the body member and in engagement with the threads on the jaws. The body member can be rotatably disposed with respect to the nut by means of a bearing assembly disposed between the nut and the body member. The bearing assembly can include a self-contained anti-friction bearing assembly disposed adjacent a thrust receiving portion of the body member.

A nut retainer member maintains the nut on the body by limiting axial movement of the nut beyond a predetermined location. The nut retainer member includes a frusto-conical portion and is held on the body by a primary retention mechanism and a supplemental retention mechanism. A suitable primary retention mechanism includes press-fitting the nut retainer member onto the body. A suitable supplemental retention mechanism includes at least one groove formed in the body and at least one detent formed in nut retainer member and received in the groove.

The chuck also includes a generally cylindrical sleeve member in driving engagement with the nut and overlying the nose section of the body member whereby when the sleeve member is rotated with respect to the body member, the jaws will be moved thereby.

The chuck further includes a spring member disposed selectively rotatably with respect to the nut. The spring member can engage the sleeve member via at least one of a plurality of indentations configured in an inner surface of the sleeve member. The spring member can have at least one arm biased toward the sleeve member, and this arm can have at least one tab configured to engage one of the indentations of the sleeve member. With a tab engaged in an indentation, a restraining torque acts to prevent relative rotation between the spring member and the sleeve (and the nut operatively connected to the sleeve). The spring member can be disposed between the nut and a thrust receiving portion of the body member so that a rearward axial thrust locks the spring member nonrotatably relative to the body member when the nut is rotated to tighten the jaws about the shaft of the tool in the desired manner. When this occurs, further tightening of the nut causes the sleeve member to rotate with respect to the spring member as the tabs move between adjacent indentations in the sleeve member.

The body member of the chuck can further include an engagement portion configured and disposed to be selectively engaged by a portion of the spring member. The spring member also can include a pawl member disposed to selectively engage the knurled portion of the body member. The sleeve member can include a detent section configured to cause the pawl member to engage the knurled portion of the body member so that a further restraining torque acts to prevent relative rotation between the spring member and the body member. The spring member can be rotatably disposed with respect to the nut by disposing the bearing assembly between the nut and the spring member.

These and other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
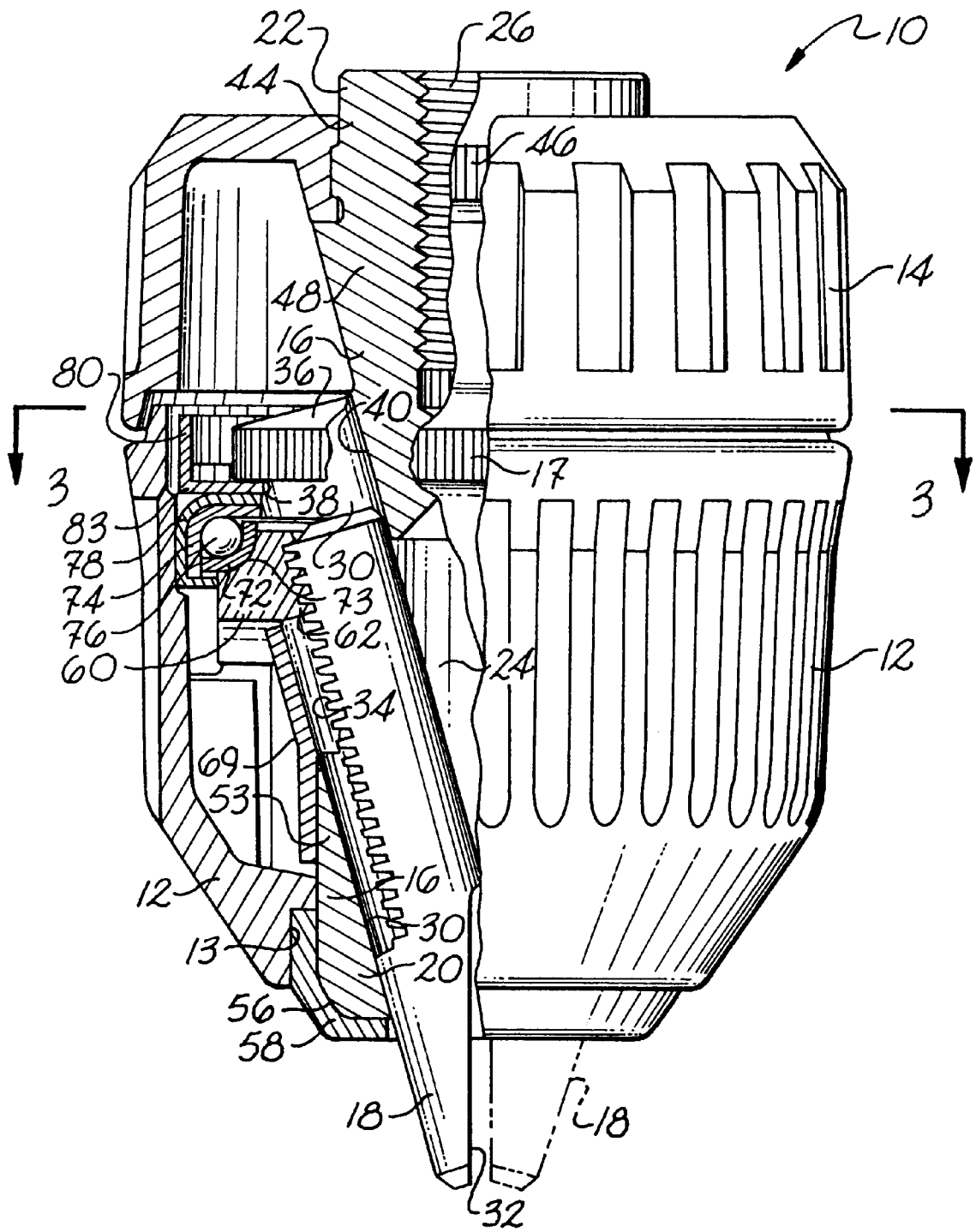
FIG. 1 is a front plan view, partly in section, of a chuck in accordance with an embodiment of the present invention.

Repeat use of reference characters in the present specification and drawings is intended to represent same or analogous features or elements of embodiments of the invention.

DETAILED DESCRIPTION OF PREFERRED EMBODIMENT

It is to be understood by one of ordinary skill in the art that the present discussion is a description of exemplary embodiments only, and is not intended as limiting the broader aspects of the present invention, which broader aspects are embodied in the exemplary construction. Commonly owned application Ser. No. 08/514,515, filed on Aug. 11, 1995, now abandoned, now Continuation Ser. No. 08/755,848 filed Dec. 6, 1996, is hereby incorporated herein by this reference. The same numerals are assigned to the same components throughout the drawings and description. In addition, comparable elements of different embodiments are designated by numerals that differ numerically by a factor of 100.

Figure 2:
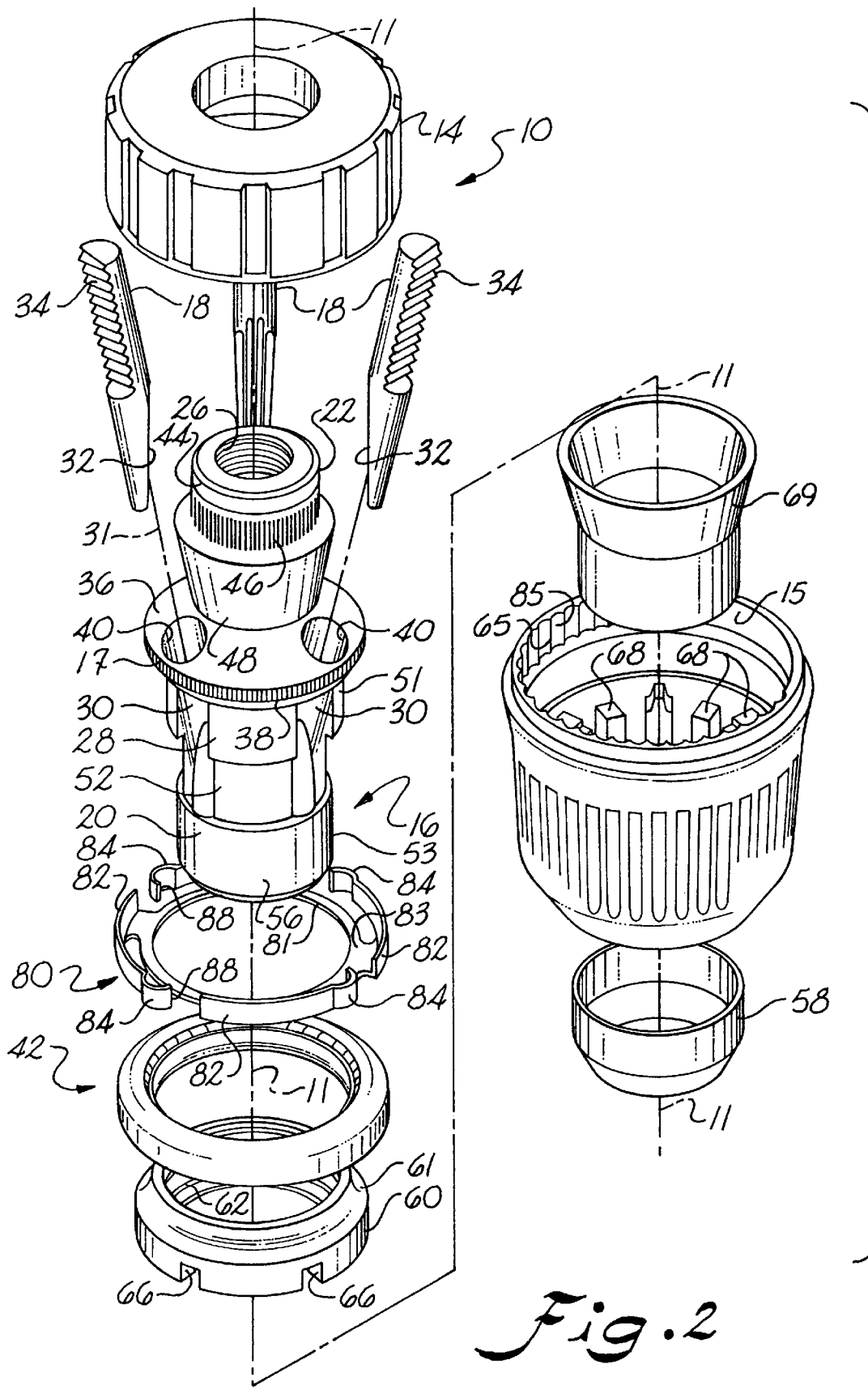
FIG. 2 is an elevated perspective assembly view of the chuck body and certain other parts illustrated in one or both of FIGS. 1 and 4.
Figure 3:
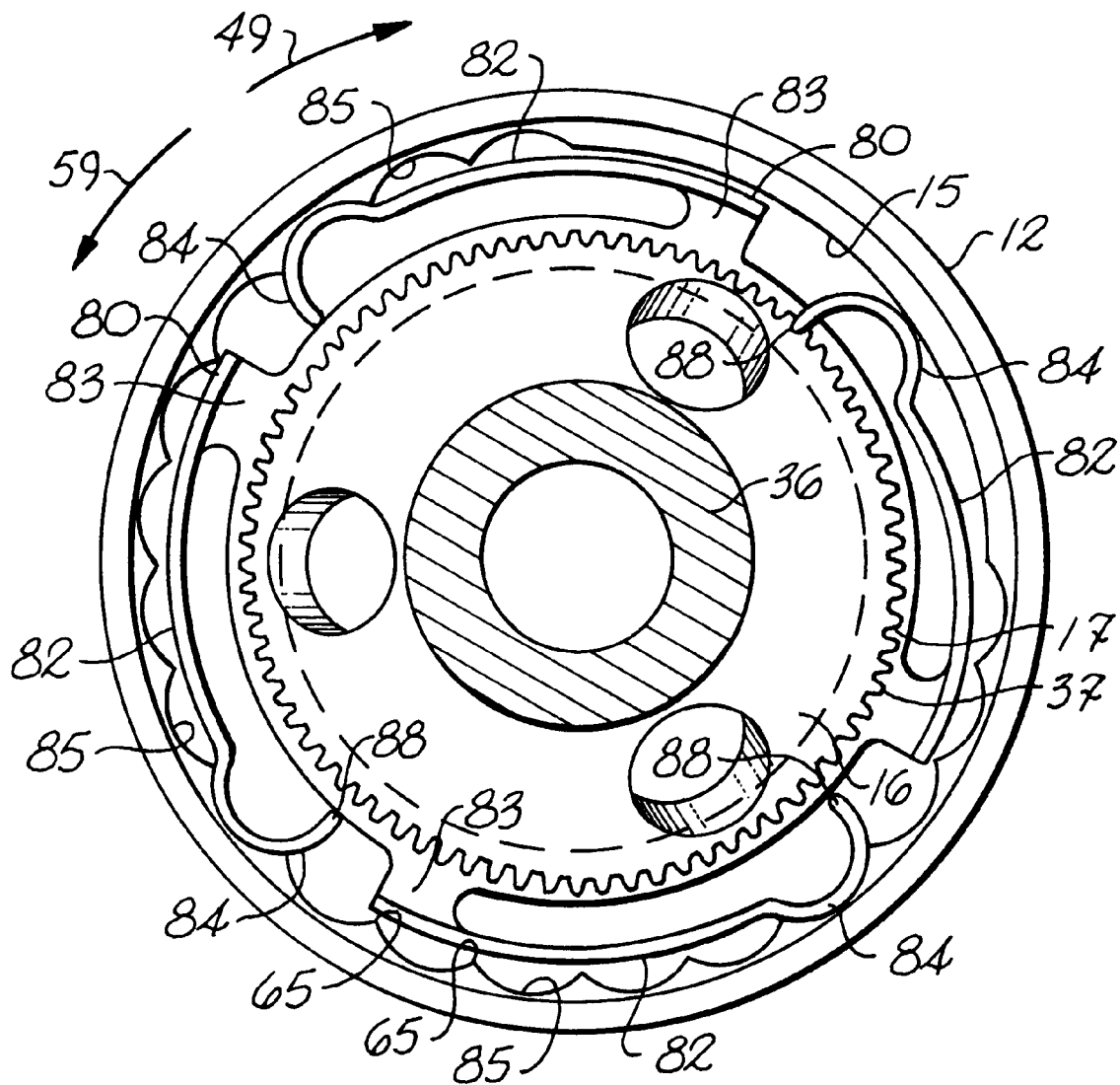
FIG. 3 is a cross-sectional view taken in the direction of the arrows 3, 3 in FIG. 1.
Figure 4:
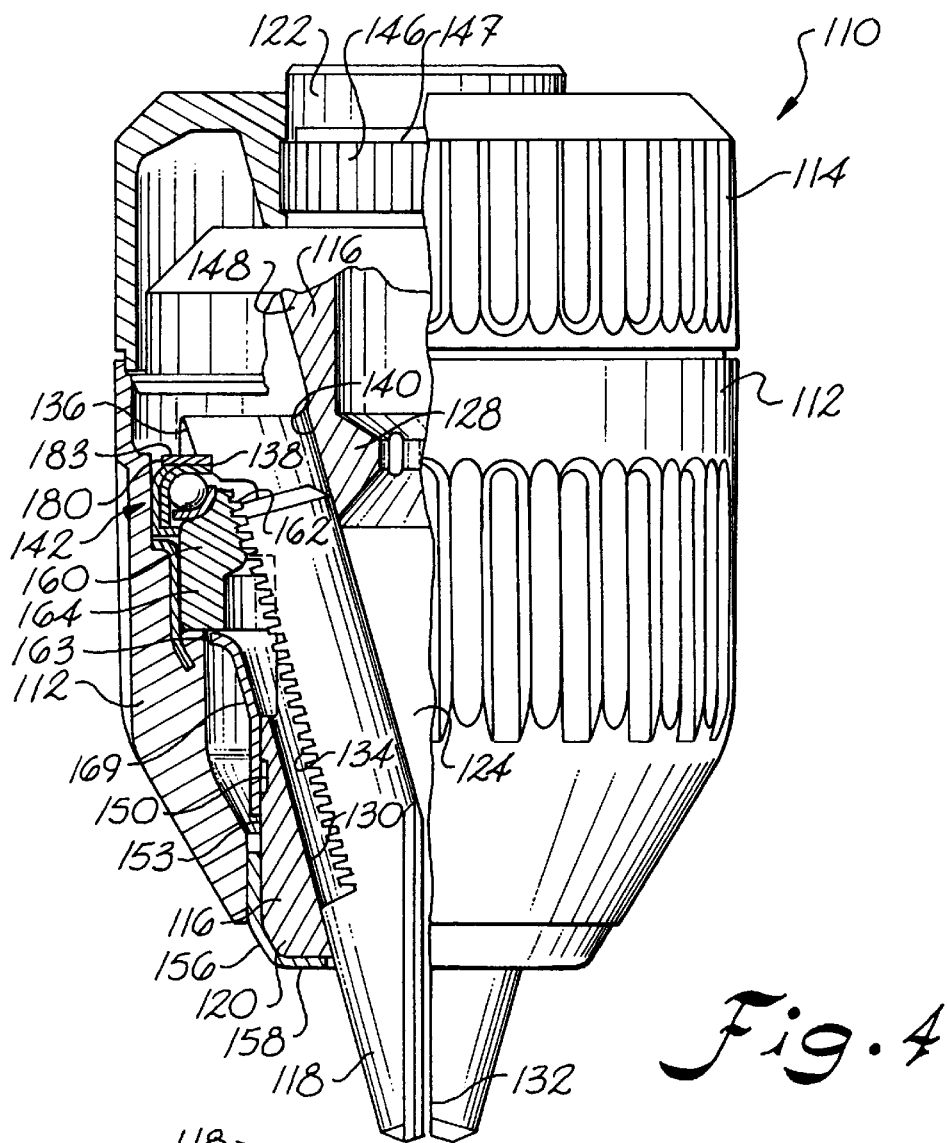
FIG. 4 is a front plan view, partly in section, of a chuck in accordance with a presently preferred embodiment of the invention.
Figure 5:
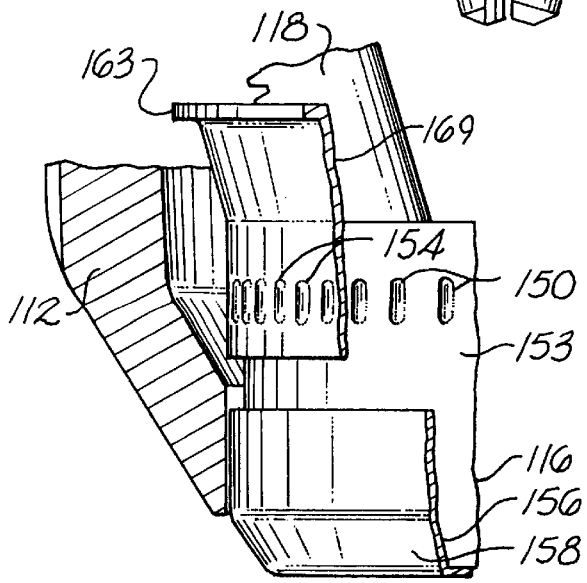
FIG. 5 is a front plan view, partly in section, of details of the presently preferred embodiment of FIG. 4.

A preferred embodiment of the chuck device of the present invention is shown in FIGS. 4 and 5. An alternative embodiment of a chuck of the present invention is shown in FIGS. 1–3. The chuck device of the present invention is represented generally in the FIGS. by the numerals 10, 110, depending on the particular embodiment.

Referring to each of FIGS. 1 and 4, a chuck 10, 110 in accordance with the present invention is respectively illustrated. Each of chucks 10, 110 includes a sleeve member 12, 112, an optional rear sleeve member 14, 114, a body member 16, 116, and a plurality of jaws 18, 118.

As shown in FIGS. 1 and 4, sleeve member 12, 112 is adapted to be loosely fitted over body member 16, 116 of chuck 10, 110. The exterior circumferential surface of the sleeve member 12, 112 may be knurled or may be provided with longitudinal ribs or other protrusions to enable the operator to grip it securely. In like manner, the outer circumferential surface of the rear sleeve member 14, 114, if employed, may be knurled or ribbed if desired. When the rear sleeve member 14, 114 is omitted, the sleeve member 12, 112 may extend to the end of the tail section (described below) of body 16, 116. Such a single sleeve embodiment is particularly preferred when a spindle lock or the like is provided on the driver or when the driver is used to tighten or loosen the jaws.

The sleeve 12, 112 and rear sleeve 14, 114 may be made from a structural plastic such as polycarbonate, a filled polypropylene such as glass filled polypropylene, or a blend of structural plastic materials. Other composite materials such as, for example, graphite filled polymerics also would be suitable in certain environments. As will be appreciated by one skilled in the art, the materials from which the chuck of the present invention is fabricated will depend on the end use of the chuck, and the above are provided by way of example only.

Referring to FIGS. 1 and 4, body member 16, 116 is generally cylindrical in shape and comprises a nose or forward section 20, 120 and a tail or rearward section 22, 122. As shown in FIGS. 1 and 4, an axial bore 24, 124 is formed in the nose section 20, 120 of the body member 16, 116. Axial bore 24, 124 is somewhat larger than the largest tool shank that the chuck is designed to accommodate. As shown in FIGS. 1 and 4, sleeve member 12, 112 is adapted to be loosely fitted over nose section 20, 120.

As shown in FIGS. 1 and 2, a threaded bore 26, is formed in tail section 22 of body 16. Threaded bore 26 (126) may communicate with axial bore 24 (124) at the central region 28, 128 of body member 16, 116. Threaded bore 26 is of a standard size to mate with the drive shaft of a powered or hand driver (not shown). While a threaded bore 26 is illustrated, such bore could be replaced with a tapered bore of a standard size to mate with a tapered drive shaft. Similarly, a threaded or tapered bore would suffice for the embodiment of FIG. 4.

As shown in FIGS. 1 and 4, a separate passageway 30, 130 is formed in body member 16, 116 to slidably accommodate each jaw 18, 118. A plurality of jaws 18, 118 and corresponding passageways 30, 130 are provided. When three jaws 18, 118 are employed, each jaw 18, 118 is separated from the adjacent jaw by an arc of approximately 120 degrees. As shown in FIG. 2, the longitudinal axes 31 of the passageways 30 and the jaws 18 are angled with respect to the central longitudinal axis 11 of the chuck 10, but intersect the chuck axis 11 at a common point ahead of the chuck body 16. As shown in FIGS. 1 and 4, each jaw 18, 118 has a tool engaging face 32, 132 which is generally parallel to the central longitudinal axis 11 of the chuck body 16, 116. Each jaw 18, 118 has threads 34, 134 on its outer surface, which is opposite tool engaging face 32, 132. Threads 34, 134 of any suitable type and pitch may be utilized within the scope of the present invention as would be readily apparent to one skilled in the art.

As illustrated in FIGS. 1 and 4, body member 16, 116 includes a thrust ring member 36, 136, which constitutes the thrust-receiving portion 36, 136 of body member 16, 116. In a preferred embodiment, thrust ring member 36, 136 is integral with body member 16, 116. Although not presently preferred, thrust ring member 36, 136 may be a separate component from the body member. As shown in FIGS. 2 and 4, thrust ring member 36, 136 includes a ledge portion 38, 138. As shown in FIGS. 2 and 4, the ledge portion can be adapted for engagement with the shroud or outer race of a self-contained anti-friction bearing assembly 42, 142 as will be described in more detail below. As shown in FIGS. 1 and 4, thrust ring member 36, 136 includes a jaw guideway 40, 140 formed in alignment with passageway 30, 130 to permit movement (retraction and extension) of jaw 18, 118 through guideway 40, 140. A separate guideway 40, 140 is provided for each of the plurality of passageways 30, 130 and jaws 18, 118.

Referring to FIGS. 1 and 4, tail section 22, 122 of body member 16, 116 can include a rear cylindrical portion 44, 144 with a knurled surface 46, 146 thereon for receipt of optional rear sleeve 14, 114 to be pressed thereon if so desired. Body 16, 116 further includes a first tapered portion 48, 148 extending from rear cylindrical portion 44, 144 to the region of thrust ring 36, 136.

As shown in FIG. 2, a first central cylindrical portion 51 extends from the region of thrust ring 36 to a second central cylindrical portion 52 having a diameter less than first central cylindrical portion 51. A front cylindrical portion 53 extends from one end of second central cylindrical portion 52 to a beveled nose portion 56. The presently preferred embodiment of FIG. 4 is similarly configured, though only front cylindrical portion 153 and beveled nose portion 156 are readily discernible in the view shown.

As shown in FIGS. 1 and 4, nose portion 56, 156 is adapted to receive a nosepiece 58, 158 that is press-fit thereon. Since nosepiece 58, 158 is exposed when the chuck is assembled, nosepiece 58, 158 serves the additional function of providing an aesthetically pleasing cover for nose portion 56, 156. In one embodiment, nosepiece 58, 158 may be coated with a non-ferrous metallic coating to prevent rust and to enhance its appearance. Examples of suitable coatings include zinc or nickel, however, it should be appreciated that any suitable coating could be utilized. The nosepiece 58, 158 with a rust-resistant coating yields the advantage of providing an aesthetically pleasing appearance without the expense of coating the entire body member 16, 116 in order to counteract rusting.

As shown in FIGS. 1 and 4, the present invention further includes a nut 60, 160 rotatably mounted with respect to body member 16, 116 and in engagement with threads 34, 134 on jaws 18, 118. Nut 60, 160 includes threads 62, 162 for mating with threads 34, 134 on jaws 18, 118 whereby when nut 60, 160 is rotated with respect to body 16, 116, the jaws 18, 118 will be advanced or retracted in a particular direction along the longitudinal axis 31 (FIG. 2 only) of the passageways 30. The axis 31 of passageways 30 has a directional component along the longitudinal axis 11 of the body member 16.

Preferably, nut 60, 160 is configured in the form of a one piece nut, but could be formed in two or more pieces that could be joined together or merely concentrically disposed.

In accordance with the present invention, the nut is connected to the sleeve in a manner so that when the sleeve is rotated, the nut will rotate therewith and move the jaws as set forth above. A preferred manner of connecting the nut to the sleeve is shown in the embodiment of FIG. 4 for example, wherein sleeve 112 is pressed onto nut 160. In an alternative embodiment shown in FIG. 2 for connecting the nut to the sleeve, nut 60 may include drive slots 66 for mating with drive ribs 68 on sleeve 12. As shown in FIG. 1, sleeve 12 may include an annular ledge portion 13 disposed about nose section 20 of body member 16. In this alternative embodiment, nosepiece 58 is dimensioned and adapted to be pressed onto beveled nose portion 56 of nose section 20 to maintain sleeve member 12 in position on chuck 10 and in driving engagement with nut 60. It should be appreciated that nosepiece 58 could also be secured to body 16 by snap fitting, threading or the like. Moreover, a snap ring, fitting, threading or the like could be utilized to maintain the sleeve 12 in place in the alternative embodiment of FIG. 1, or the sleeve 12 could be otherwise secured to the nut 60. However, in each embodiment, nut 60, 160 is connected to sleeve 12, 112 in a manner so that when sleeve 12, 112 is rotated, nut 60, 160 will rotate therewith and move jaws 18, 118 as set forth above.

It will be appreciated that rear sleeve member 14, 114 is fixed to body member 16, 116, while sleeve member 12, 112 is operatively associated with nut 60, 160 and rotatable with respect to body member 16, 116. Because of the interaction between threads 34, 134 on jaws 18, 118 and threads 62, 162 on nut 60, 160, relative movement of the front and rear sleeve members, 12, 112 and 14, 114, causes jaws 18, 118 to be advanced or retracted, depending upon the direction of relative movement.

As shown in FIGS. 1 and 4, a nut retainer member 69, 169 is configured and disposed so as to cooperate with front cylindrical portion 53, 153 of body member 16, 116 in a manner that retains nut 60, 160 from moving axially toward nose section 20, 120 of body member 16, 116. Nut retainer member 69, 169 thereby limits axial movement of nut 60, 160 beyond a predetermined location. As shown in FIGS. 2 and 5, nut retainer 69, 169 is generally configured with a cylindrically shaped section joined to a frusto-conical portion that is shaped in a truncated conical form. As shown in FIGS. 1 and 4, the cylindrically shaped section of nut retainer member 69, 169 is desirably press-fitted to front cylindrical portion 53, 153 of body member 16, 116, and this press-fit constitutes a primary retention mechanism for holding nut retainer member 69, 169 on body member 16, 116.

In a preferred embodiment, a supplemental retention mechanism is provided for further holding nut retainer member 169 on body 116. As shown in FIGS. 4 and 5 for example, the supplemental retention mechanism can include at least one groove 150 formed in front cylindrical portion 153 of body member 116. As shown in FIG. 5, the portion of the cylindrically shaped section of nut retainer member 169 that overlies each groove 150, is crimped to form a detent 154 that is received in groove 150, thereby supplementally attaching nut retainer member 169 to body member 116. As shown in FIG. 5, a plurality of grooves 150 and detents 154 can be provided and disposed circumferentially around body member 116 and nut retainer member 169, respectively in a symmetrical and coincident fashion. In a preferred embodiment, a continuous groove may be provided circumferentially about body member 16, 116. In such embodiment, nut retainer member 69, 169 includes a circumferential interior ridge or detent that is received by the continuous groove to axially secure the nut retainer member.

Figure 6:
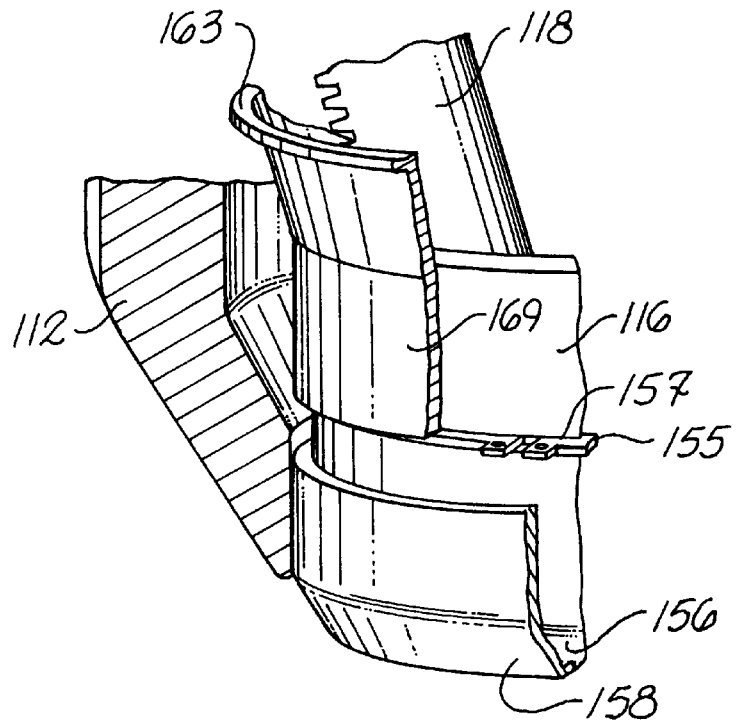
FIG. 6 is a truncated elevated perspective view, partly in section, of details of an alternative embodiment of the present invention shown in FIGS. 5 and 7.

In an alternative embodiment shown in FIG. 6 for example, the supplemental retention mechanism includes a retainer ring 155 disposed in a groove 157 formed circumferentially around body member 116. Retainer ring 155 prevents axial movement of the free end of the cylindrically shaped section of nut retainer member 169.

Figure 7:
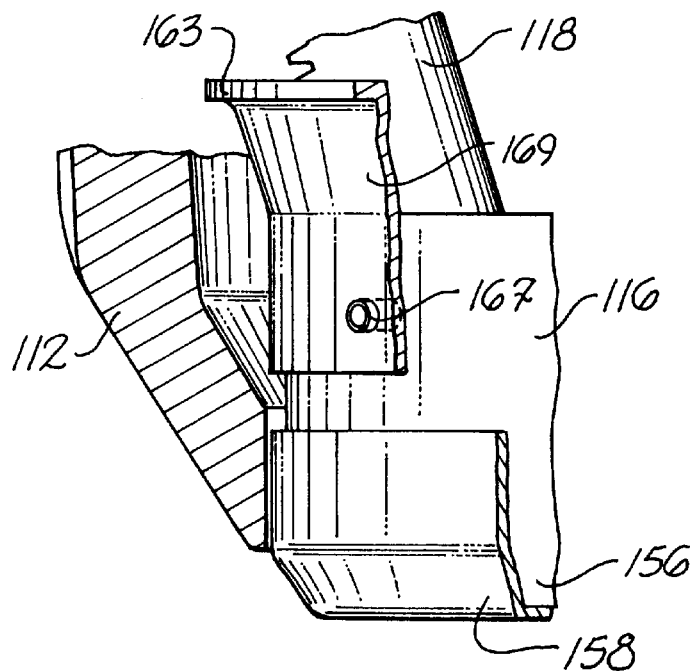
FIG. 7 is a truncated elevated perspective view, partly in section, of details of an alternative embodiment of the present invention shown in FIGS. 5 and 6.

In a further alternative embodiment shown in FIG. 7 for example, the supplemental retention mechanism includes at least one and preferably a plurality of stakes or pins 167 disposed in and through the cylindrical portion of nut retainer member 169 and into front cylindrical portion 153 of body member 116. Each stake or pin 167 prevents axial movement of nut retainer member 169 and is disposed circumferentially around nut retainer member 169 and front cylindrical portion 153 of body member 116.

In a preferred embodiment shown in FIGS. 4–7, the truncated conical section of nut retainer 169 terminates in a free end formed as a radially flared skirt portion 163 that provides an axial stop for nut 160, which has an axially prominent extension portion 164 (FIG. 4) with a free end to engage the skirt portion 163 of nut retainer 169. The alternative embodiment shown in FIGS. 1 and 2 has a skirt-less free end that provides an axial stop for nut 60, which is more axially compact.

In further accordance with the present invention, a spring member is provided. As shown in FIGS. 1 and 4, a spring member 80, 180 is configured and disposed about body member 16, 116. The configuration and operation of spring member 80 is essentially the same as that of spring member 180. As shown in FIG. 2, an inner surface of an annular ring portion 83 of spring member 80 defines a centrally disposed opening 81 that permits spring member 80 to be disposed about body member 16. As shown in FIGS. 1 and 4, annular ring portion 83, 183 of spring member 80, 180 is configured and disposed to rest against ledge 38, 138 of thrust ring 36, 136. As shown in FIG. 2, the diameter of opening 81 is large enough so as not to impede movement of jaws 18 through guideways 40 in thrust ring 36 of body member 16.

As shown in FIGS. 1 and 3, spring member 80 includes at least one arm 82 resiliently biased toward sleeve member 12 and carrying on the free end of arm 82 at least one tab 84 configured to engage sleeve member 12. As shown in FIGS. 2 and 3, a plurality of indentations 85 are configured and disposed in an inner surface near the rear edge of sleeve member 12 so as to engage and receive the corresponding tab 84 disposed at the free end of arm 82 of spring member 80. As shown in FIGS. 2 and 3, spring member 80 has a plurality of arms 82 and associated tabs 84, and four tabs 84 are shown in FIG. 3 disposed circumferentially and symmetrically around the outer periphery of spring member 80.

Each arm 82 resiliently deflects radially (in a general sense) inwardly toward the center of opening 81 and thereby is biased to move radially (again in a general sense) outwardly away from opening 81 in opposition to this radial inward deflection. In this way, tabs 84 of arms 82 are biased into indentations 85 and thus are configured so that a circumferential force (torque) between sleeve 12 and spring 80 is needed to overcome the engagement between indentations 85 and corresponding received tabs 84. Thus, the engagement between indentations 85 and corresponding tabs 84 provides a restraining torque. So long as this engagement does not slip during manual movement of nut 60 by rotation of sleeve member 12, then sleeve member 12, nut 60 and spring member 80 rotate in unison rather than relative to one another. This also characterizes the operating relationship of nut 160, sleeve member 112 and spring member 180.

As nut 60 is rotated (in the direction of arrow 59 in FIG. 3) so that jaws 18 are increasing the forward gripping force applied to the shaft of a tool, a corresponding axial force is increasingly exerted rearwardly through jaws 18 to nut 60. This rearward axial force is transmitted through nut 60, 160 and bearing 42, 142 to body member 16, 116, and particularly to ledge 38, 138 of thrust ring 36, 136 of body member 16, 116. Moreover, as shown in FIGS. 1 and 4, spring member 80, 180 is disposed between nut 60, 160 and thrust-receiving portion 36, 136 of body member 16, 116. Thus, the axial force from nut 60, 160 is transmitted rearwardly through annular ring portion 83, 183 of spring member 80, 180 to ledge 38, 138 of thrust ring 36, 136 of body member 16, 116. Accordingly, this rearward axial force results in a clamping force that sandwiches annular ring portion 83, 183 of spring member 80, 180 between ledge 38, 138 of thrust ring 36, 136 of body member 16, 116 and the shroud or outer race of bearing assembly 42, 142 (described below). In this way, spring member 80, 180 becomes locked to body member 16, 116 and so becomes selectively disposed nonrotatably with respect to body member 16, 116.

The effect of clamping spring member 80, 180 to body member 16, 116 is a resulting frictional force between ledge 38, 138 of thrust ring 36, 136 of body member 16, 116 and annular ring portion 83, 183 of spring member 80, 180 that is directed circumferentially in a direction (arrow 49 in FIG. 3) that is opposite to the direction (arrow 59 in FIG. 3) that sleeve 12 and nut 60 are being manually rotated by the user to tighten the chuck. Accordingly, this resulting frictional force acts to restrain circumferential movement of spring member 80, 180 with respect to thrust ring 36, 136 of body member 16, 116. Thus, when the jaws 18 are tightened around the shaft of a tool in the desired manner, the resulting frictional force prevents further rotation of spring member 80, 180 with respect to body member 16, 116.

In a conventional chuck used to secure a drill engaged in hammer drilling for example, the vibration that results from use of the tool may produce a torque on the sleeve member that tends to loosen or tighten the grip of the chuck. Because the sleeve and the nut rotate in unison, this torque may tend to cause the chuck to undesirably tighten and jam or, on the other hand, cause the jaws 18 to loosen (i.e., release) their grip around the shaft of the tool. However, in accordance with the chuck of the present invention, the tension in the resilient arm 82 of spring member 80 and the configuration of tabs 84 in relation to the configuration of indentations 85, can be controlled to produce a restraining torque that counteracts such undesirable torque during use. Thus, before sleeve 12, 112 can rotate with respect to spring member 80, 180 (and with respect to body member 16, 116 secured to spring member 80, 180 by the aforementioned rearwardly acting axial force), the magnitude of the torque caused by vibrations acting on sleeve member 12, 112 must exceed the restraining torque that prevents spring member 80, 180 from rotating relative to sleeve member 12, 112. The desired magnitude of this restraining torque desirably is such as to prevent such vibrations from causing sleeve member 12, 112 (and nut 60, 160 connected thereto) to rotate in a chuck-loosening or tightening direction relative to body member 16, 116. This ensures that jaws 18, 118 do not loosen or undesirably tighten their desired grip around the tool shaft during such vibration of the tool when in use for its intended purpose such as hammer drilling or any other application that involves vibrations.

Upon application of a torque to the sleeve member 12, 112 that exceeds the restraining torque, the sleeve member 12, 112 and the nut 60, 160 connected thereto will be selectively rendered rotatable with respect to the spring member 80, 180, which will be fixed nonrotatably to the body member 16, 116 by means of the clamping force that results from the rearwardly applied axial thrust that holds annular ring portion 83, 183 of spring member 80, 180 against the thrust-receiving portion 36, 136 of body member 16, 116.

As shown in FIGS. 1 and 2, the exterior surface of body member 16 includes an engagement portion in the form of a ratchet wheel portion 17. A similar ratchet wheel portion is provided in the embodiment of FIG. 4, but is not visible in the view shown. This ratchet wheel portion 17 is shaped with a cylindrical surface that is provided with a plurality of teeth 37 (FIG. 3) to form a surface that is knurled or ridged. As shown in FIG. 1, this knurled or ridged portion 17 is configured to be disposed so that it can selectively engage a portion of spring member 80.

In further accordance with the chuck of the present invention, the spring member is provided with a pawl element. As shown in FIGS. 2 and 3, a pawl element 88 is disposed at the free end of resilient arm 82 and is biased toward sleeve member 12 in a radial direction relative to central axis 11 of chuck 10. As shown in FIGS. 1 and 3, pawl element 88 is disposed adjacent the engagement portion formed by ratchet wheel portion 17 of body member 16. As explained below, pawl element 88 is configured and disposed to become selectively engaged with the teeth 37 forming the knurled or ridged surface of ratchet wheel portion 17 of body member 16. Although a pawl and ratchet configuration is illustrated, it should be understood that various suitable mechanisms may be employed for providing an additional selective lock between the spring and the body.

As shown in FIGS. 2 and 3, indentations 85 are disposed adjacent peaks 65 around a portion of the interior circumference of front sleeve member 12. Moreover, at least one detent section 15 is formed in the interior surface of front sleeve member 12. As shown in FIGS. 2 and 3, detent section 15 is formed by an unfluted portion of the interior circumference of front sleeve member 12. There is an absence of adjacent indentations 85 and peaks 65 in this unfluted portion that forms detent section 15. Front sleeve 112 is similarly configured.

As shown in FIG. 3, when body member 16 remains stationary and sleeve 12 is rotated in the direction indicated by the arrow designated by the numeral 59, jaws 18 tighten their grip on the tool shank held by chuck 10. Thus, the chuck-tightening direction of sleeve 12 is indicated by the arrow 59. As explained above, when sleeve 12, 112 is rotated in the tightening direction (arrow 59 in FIG. 3), an axial force causes spring member 80, 180 eventually to become locked to body member 16, 116 and thus cease to rotate relative to body member 16, 116. Once spring member 80, 180 ceases to rotate relative to body member 16, 116, further rotation of sleeve 12, 112 in the tightening direction (arrow 59 in FIG. 3) causes one of tabs 84 to move out of an indentation 85 and past the peak 65 disposed adjacent the indentation 85 in question. Detent section 15 is configured as shown in FIG. 3 to engage one of tabs 84 in a manner so as to cause pawl element 88 to move radially away from sleeve member 12. The radius from central axis 11 to detent section 15 is less than the radius from central axis 11 to an indentation 85.

When one of tabs 84 moves past a peak 65, pawl member 88 may or may not become positioned between adjacent teeth 37 of ratchet portion 17. Whether such engagement occurs depends upon a number of factors. These factors would include whether the radius from central axis 11 to detent section 15 is less than the radius from central axis 11 to the peak 65. The distance between the free end of pawl member 88 and teeth 37 when tab 84 is positioned in an indentation 85, also plays a role in determining whether the free end of pawl member 88 may touch teeth 37 during this rotational movement of sleeve 12 relative to body 16.

However, further rotation of sleeve member 12 eventually causes tab 84 to engage detent section 15. This causes arm 82 to become resiliently deflected radially (in a general sense) inwardly toward the central axis 11 of chuck 10 and forces pawl element 88 between adjacent ones of the ridges or teeth 37 formed on ratchet wheel portion 17. With pawl element 88 positioned in this manner, spring member 80 becomes additionally locked to body member 16 and sleeve member 12. This state of nonrotation between spring member 80 and sleeve 12 and between spring member 80 and body member 16, is shown in FIG. 3 as pawl element 88 becomes forced between adjacent teeth 37 and restrains relative rotation between body member 16 and spring member 80. This nonrotatable state persists until a predetermined releasing torque is applied by the operator between sleeve member 12 and body member 16 in the loosening direction indicated by the arrow designated by the numeral 49 in FIG. 3.

In this way, the pawl element 88 is configured and disposed such that when the jaws of the chuck are desirably gripping the shank of the tool, the spring member 80 becomes constrained against rotation with respect to both the nut 60 and the body member 16, and a predetermined releasing torque must be applied by the operator in the loosening direction of arrow 49 in FIG. 3 before the nut 60 can rotate with respect to the body member 16. Thus, the engagement between pawl element 88 and ratchet wheel portion 17 provides an additional restraining torque to the restraining torque provided by the clamping force resulting from the axial thrust load between bearing 42, 142 (described below) and body member 16, 116. So long as these engagements (pawl member 88/teeth 37 and tabs 84/indentations 85) do not slip, i.e., the restraining torque is not overcome, then sleeve member 12, nut 60 and spring member 80 become nonrotatable relative to one another and relative to body member 16. Thus, pawl element 88, tab 84 and ratchet wheel portion 17 are configured so that a circumferentially directed force (torque) is needed to overcome the engagement between ratchet wheel portion 17 and pawl element 88, tabs 84 and indentations 85, and between detent section 15 and tab 84.

Preferably, detent 15 extends along the inner circumference of sleeve 12 so that there is only one position at which all the tabs 84 are received by an indentation 85. The tabs ride in these indentions as the sleeve is tightened until the spring is locked against the ledge 36 as described above. At that point, any further tightening rotation of the sleeve pushes one of the pawls 88 into the rachet portion 17, supplementally locking the spring to the body. The sleeve may be further tighteningly rotated but generally not so far that the detent will pass over the engaged pawl 88. Upon turning the sleeve in the loosening direction, the sleeve will remain locked to the body until the detent passes back over the engaged pawl so that its tab 84 is received by the first indentation following the detent. At that point, the axial force pressing the spring to the ledge 66 has also been released, and the spring will again be rotated with the sleeve.

Establishing the above-described detent may be achieved by determining the number of indentations 85 that should be provided on sleeve 12. If the spring has N equally spaced arms, the number of indentations (n) is preferably given by:

$$n=(360/\Theta)(N-1)/N+1,$$

where $\Theta$ is the angle in degrees between adjacent indentations and where $360/\Theta N$ is an integer value.

As noted above, spring member 80 is rotatably disposed with respect to nut 60. This is desirably accomplished by means of a bearing assembly disposed between the nut and the spring member. As shown in FIGS. 1 and 4, the bearing assembly disposed between nut 60 and spring member 80 can include a self-contained bearing assembly, generally designated by the numeral 42 (FIGS. 2 and 4). As shown in FIG. 1, self-contained bearing assembly 42 includes bearing elements 76 maintained between an inner race 72 and an outer race 74. In a preferred embodiment, bearing elements 76 are ball bearings. Self-contained bearing assembly 42 may further include a shroud 78 surrounding the inner and outer races 72, 74 for maintaining the bearing assembly as a self-contained component.

As shown in FIG. 1, inner race 72 includes an arcuate surface 73 that is dimensioned and configured to mate with a corresponding rearwardly-facing arcuate seating surface 61 (FIG. 2) formed as part of nut 60. Nut 60 is received for support on inner race 72 and is not in frictional contact with body 16 as in some prior art devices. Such mating relationship assists in alignment and minimization of both axial and radial stresses when the chuck is operated, as well as minimizing or eliminating frictional contact or rubbing between nut 60 and body 16. Further, such a relationship assists in maintaining the nut centered during tightening so as to provide more even tightening of the chuck and reducing run-out. This arrangement also maintains optimum thread engagement with each jaw, further increasing efficiency and reducing stress in both jaw and nut threads. In a preferred embodiment, self-contained bearing assembly 42 is a radial thrust bearing.

While the above description is set forth with respect to a keyless chuck, it should be appreciated that the principles of the present invention are equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;
   b) a plurality of jaws, a separate one of said jaws being slidably positioned in one of each of said angularly disposed passageways, each of said jaws having a jaw face formed on one side thereof and threads formed on the opposite side thereof;
   c) a nut rotatably mounted with respect to said body member and in engagement with said threads on said jaws;
   d) a spring member disposed selectively rotatably with respect to said nut; and
   e) a generally cylindrical sleeve member engaging said spring member, said sleeve member being configured and disposed in driving engagement with said nut and overlying said nose section of said body member whereby said jaws will be moved by rotation of said sleeve member with respect to said body member; and
   f) wherein said body member includes an engagement portion configured and disposed to be selectively engaged by a portion of said spring member.

2. A chuck for use with a manual or powered driver as stated in claim 1, wherein said sleeve member includes a plurality of indentations configured in an inner surface of said sleeve member to selectively engage said spring member via at least one of said plurality of said indentations.

3. A chuck for use with a manual or powered driver as stated in claim 2, wherein said spring member includes at least one arm having at least one tab configured to be selectively received in at least one of said plurality of indentations configured in said sleeve member.

4. A chuck for use with a manual or powered driver as stated in claim 1, wherein said spring member has at least one arm biased toward said sleeve member, said at least one arm having at least one tab configured to engage said sleeve member.

5. A chuck for use with a manual or powered driver as stated in claim 1, wherein said spring member is rotatably disposed with respect to said nut by means of a bearing assembly disposed between said nut and said spring member.

6. A chuck for use with a manual or powered driver as stated in claim 5, wherein said bearing assembly is a self-contained bearing assembly including an inner race, an outer race, and bearing elements maintained between said races.

7. A chuck for use with a manual or powered driver as stated in claim 1, wherein said sleeve member defines at least one unfluted portion configured to be selectively disposed to engage said spring member.

8. A chuck for use with a manual or powered driver as stated in claim 7, wherein each of said indentations is adjacent a peak, and wherein the internal radius of said sleeve member at said unfluted portion is less than the internal radius of said sleeve member at each said peak.

9. A chuck for use with a manual or powered driver as stated in claim 1, wherein said nut is a one piece nut.

10. A chuck for use with a manual or powered driver as stated in claim 1, wherein said nut is press-fit to said sleeve member.

11. A chuck for use with a manual or powered driver as stated in claim 1 and further including a rear sleeve member secured to said tail section of said body member.

12. A chuck for use with a manual or powered driver as stated in claim 1, further comprising a rust resistant nosepiece press-fit to said nose section.

13. A chuck for use with a manual or powered driver having a rotatable drive shaft, said chuck comprising:
   a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section, said body member including a thrust receiving portion;
   b) a plurality of jaws, a separate one of said jaws being slidably positioned in one of each of said angularly disposed passageways, each of said jaws having a jaw face formed on one side thereof and threads formed on the opposite side thereof;
   c) a nut rotatably mounted with respect to said body member and in engagement with said threads on said jaws;
   d) a spring member disposed selectively rotatably with respect to said nut; and
   e) a generally cylindrical sleeve member engaging said spring member, said sleeve member being configured and disposed in driving engagement with said nut and overlying said nose section of said body member whereby when said sleeve member is rotated with respect to said body member, said jaws will be moved thereby, said sleeve member having an unfluted portion configured to be selectively disposed to engage at least a portion of said spring member.

14. A chuck for use with a manual or powered driver as stated in claim 13, wherein said body member includes a ratchet wheel portion.

15. A chuck for use with a manual or powered driver as stated in claim 14, wherein said ratchet wheel portion is disposed to selectively engage a portion of said spring member.

16. A chuck for use with a manual or powered driver as stated in claim 13, wherein said sleeve member includes a plurality of indentations configured in an inner surface of said sleeve member to selectively engage said spring member via at least one of said plurality of said indentations.

17. A chuck for use with a manual or powered driver as stated in claim 16, wherein said spring member includes at least one arm having at least one tab configured to be received in at least one of said plurality of indentations configured in said sleeve member.

18. A chuck for use with a manual or powered driver as stated in claim 13, wherein said spring member has at least one arm biased toward said sleeve member, said at least one arm having at least one tab configured to engage said sleeve member.

19. A chuck for use with a manual or powered driver as stated in claim 13, wherein said spring member is rotatably disposed with respect to said nut by means of a self-contained bearing assembly including an inner race, an outer race, and bearing elements maintained between said races.

20. A chuck for use with a manual or powered driver having a rotatable drive shaft, said chuck comprising:
   a) a generally cylindrical body member having a nose section and a tail section, said tail section having an axial bore formed therein to mate with the drive shaft of the driver, said nose section having an axial bore formed therein and a plurality of angularly disposed passageways formed therethrough and intersecting said axial bore of said nose section;
   b) a plurality of jaws, a separate one of said jaws being slidably positioned in one of each of said angularly disposed passageways, each of said jaws having a jaw face formed on one side thereof and threads formed on the opposite side thereof;
   c) a nut rotatably mounted with respect to said body member and in engagement with said threads on said jaws;
   d) a nut retainer member for maintaining said nut on said body, said nut retainer member including a frusto-conical portion and being held on said body by a primary retention mechanism;
   e) a supplemental retention mechanism for further holding said nut retainer member on said body; and
   f) a generally cylindrical sleeve member configured and disposed in driving engagement with said nut and overlying said nose section of said body member whereby said jaws will be moved by rotation of said sleeve member with respect to said body member.

21. A chuck for use with a manual or powered driver as stated in claim 20, wherein said supplemental retention mechanism includes a retainer ring fixed on said body.

22. A chuck for use with a manual or powered driver as stated in claim 20, wherein said supplemental retention mechanism includes a stake attaching said nut retainer member to said body.

23. A chuck for use with a manual or powered driver as stated in claim 20, wherein said supplemental retention mechanism includes a pin attaching said nut retainer member to said body.

24. A chuck for use with a manual or powered driver as stated in claim 20, wherein said supplemental retention mechanism includes at least one detent attaching said nut retainer member to said body.

25. A chuck for use with a manual or powered driver as stated in claim 24, wherein said supplemental retention mechanism includes at least one groove formed in said body for receiving said at least one detent attaching said nut retainer member to said body.

\* \* \* \* \*